US012608884B2

(12) United States Patent (10) Patent No.: US 12,608,884 B2
Keen et al. (45) Date of Patent: Apr. 21, 2026

(54) SELECTIVE VOLUMETRIC BOUNDARY RECORDING

(71) Applicant: International Business Machines Corporation, Armonk, NY (US)

(72) Inventors: Martin G. Keen, Cary, NC (US); Carolina Garcia Delgado, Zapopan (MX); Sarbajit Kumar Rakshit, Kolkata (IN); Michael Boone, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 18/602,532

(22) Filed: Mar. 12, 2024

(65) Prior Publication Data

US 2025/0292496 A1 Sep. 18, 2025

(51) Int. Cl.
*G06T 17/00* (2006.01)

(52) U.S. Cl.
CPC .................................... *G06T 17/00* (2013.01)

(58) Field of Classification Search
CPC ...... G06F 3/011; G06F 3/04815; G06F 21/10; G06F 3/04812; G06T 19/003; G06T 19/006; G06T 17/00; G06T 2219/024; G06T 15/005; G06T 15/20; G06T 19/00; H04N 7/157; H04N 21/816
See application file for complete search history.

(56) References Cited

U.S. PATENT DOCUMENTS

| | | | |
|---|---|---|---|
| 9,616,338 B1 | 4/2017 | Hooper | |
| 11,380,068 B2 | 7/2022 | Nourai | |
| 2004/0051745 A1 | 3/2004 | Gargi | |
| 2011/0113382 A1 | 5/2011 | Cannon | |
| 2011/0210962 A1 | 9/2011 | Horan | |
| 2013/0014011 A1 | 1/2013 | Bhogal | |
| 2014/0156044 A1 | 6/2014 | Boss | |
| 2017/0048480 A1 | 2/2017 | Farrell | |
| 2021/0377491 A1 * | 12/2021 | Lyon ..................... G06T 19/003 |
| 2022/0012920 A1 * | 1/2022 | Beith ...................... G08B 3/10 |

(Continued)

FOREIGN PATENT DOCUMENTS

| | | |
|---|---|---|
| EP | 3580686 B1 | 12/2019 |
| JP | 7275227 B2 | 1/2022 |

OTHER PUBLICATIONS

"AI Image Generator—AI Image Generator is Future," https://www.aiimagegenerator.com/, printed Jan. 10, 2024, 26 pages.

(Continued)

*Primary Examiner* — Hau H Nguyen

(74) *Attorney, Agent, or Firm* — Edward J. Wixted, III

(57) ABSTRACT

One or more computer processors identifying at least one collaborating user within a virtual collaborative environment. The one or more computer processors define at least one volumetric boundary within the virtual collaborative environment. The one or more computer processors generate media content initiated by the at least one identified collaborating user within the at least one defined volumetric boundary. The one or more computer processors selectively record the generated media content within the at least one defined volumetric boundary.

20 Claims, 3 Drawing Sheets

(56)     References Cited

U.S. PATENT DOCUMENTS

2022/0047943 A1     2/2022  Shuster

OTHER PUBLICATIONS

"Facet—The best image generation tool for created professionals," https://facet.ai/, printed Jan. 10, 2024, 13 pages.

"gencraft—AI Art Image and Video Generator," https://gencraft.com/, printed Jan. 10, 2024, 8 pages.

"IAEA—Welcome to the Creator Marketplace," https://izea.com/get-started/check-for-existing-account, printed Jan. 10, 2024, 1 page.

"The AI copilot for marketing teams who want better outcomes, not just faster outputs," https://www.jasper.ai/, printed Jan. 10, 2024, 15 pages.

VEED AI—AI Image Generator, https://www.veed.io/tools/ai-image-generator, printed Jan. 10, 2024, 15 pages.

* cited by examiner

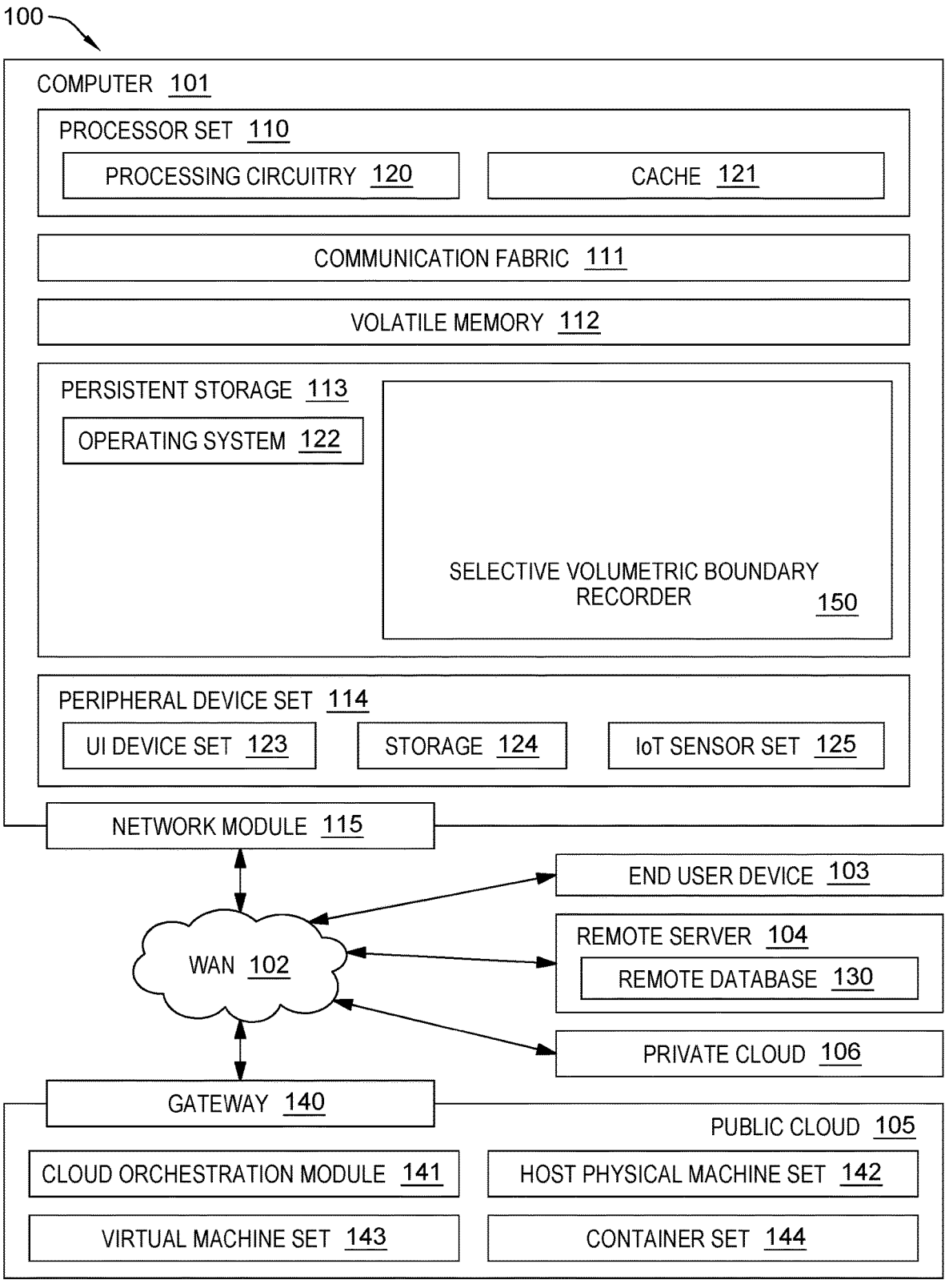

100

COMPUTER  101

PROCESSOR SET  110

PROCESSING CIRCUITRY  120      CACHE  121

COMMUNICATION FABRIC  111

VOLATILE MEMORY  112

PERSISTENT STORAGE  113

OPERATING SYSTEM  122

SELECTIVE VOLUMETRIC BOUNDARY RECORDER          150

PERIPHERAL DEVICE SET  114

UI DEVICE SET  123      STORAGE  124      IoT SENSOR SET  125

NETWORK MODULE  115

WAN  102

END USER DEVICE  103

REMOTE SERVER  104

REMOTE DATABASE  130

PRIVATE CLOUD  106

GATEWAY  140

PUBLIC CLOUD  105

CLOUD ORCHESTRATION MODULE  141      HOST PHYSICAL MACHINE SET  142

VIRTUAL MACHINE SET  143      CONTAINER SET  144

START

IDENTIFY VOLUMETRIC BOUNDARY
WITHIN COLLABORATIVE ENVIRONMENT — 202

DETERMINE ONE OR MORE
COORDINATES CORRESPONDING TO
IDENTIFIED VOLUMETRIC BOUNDARIES — 204

GENERATE MEDIA CONTENT FOR
IDENTIFIED VOLUMETRIC
BOUNDARIES — 206

SELECTIVELY RECORD GENERATED
MEDIA CONTENT — 208

END

SELECTIVE VOLUMETRIC BOUNDARY RECORDING

BACKGROUND

The present invention relates generally to the field of virtual reality, and more particularly to recording in virtual reality.

A volumetric video forms a visual representation of an object in three physical dimensions, as opposed to a planar image of traditional videos which simulate depth through a number of different visual effects. A volumetric video produces in an observer a visual experience of a material object in three-dimensional space. The perceived object displays characteristics similar to an actual material object by allowing the observer to view it from any direction and focus a view on a specific detail.

Virtual reality (VR) collaboration or virtual collaboration enables artists to weave together diverse talents and skillsets, incorporate elements of gaming, virtual reality, and augmented reality into a creative, virtualized canvas. The result is an entirely new form of media that immerses audiences in dynamic, participatory narratives, ushering in an era where stories are experienced, not merely consumed. The virtual reality's ability to merge physical and digital realms creates opportunities for live concerts, theatre productions, and art exhibitions where audiences can actively engage and co-create content, revolutionizing the entertainment industry and redefining the boundaries of traditional media.

SUMMARY

Embodiments of the present invention disclose a computer-implemented method, a computer program product, and a system. The computer-implemented method includes one or more computer processers identifying at least one collaborating user within a virtual collaborative environment. The one or more computer processors define at least one volumetric boundary within the virtual collaborative environment. The one or more computer processors generate media content initiated by the at least one identified collaborating user within the at least one defined volumetric boundary. The one or more computer processors selectively record the generated media content within the at least one defined volumetric boundary.

BRIEF DESCRIPTION OF THE DRAWINGS

FIG. 1 is a functional block diagram illustrating a computing environment, in accordance with an embodiment of the present invention;

DETAILED DESCRIPTION

Figure 2:
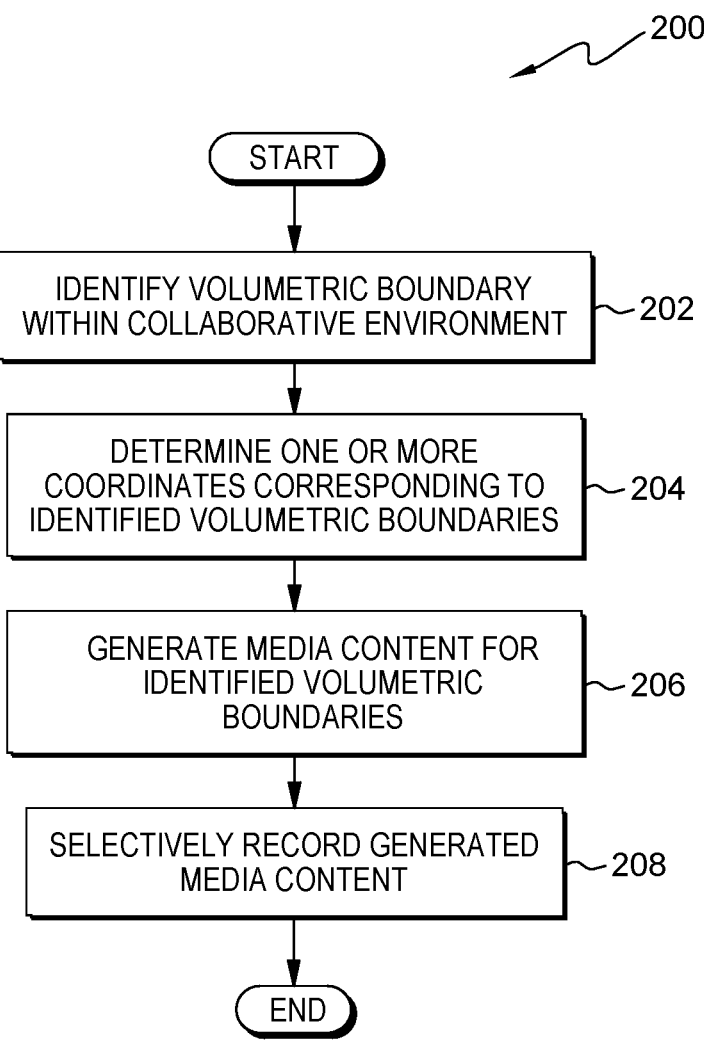
FIG. 2 is a flowchart depicting operational steps of a program, on a computer within the computing environment of FIG. 1, for selective volumetric boundary recording, in accordance with an embodiment of the present invention.

As organizations and corporations continue to rapidly globalize and decentralize; the need for efficient and effective collaboration for global partners becomes mission critical. This need is further exacerbated in global content creation or media content generation. In this new, globalized world, current media collaboration techniques struggle to maintain effectiveness in the face of changing technologies and business demands. Globalized artists, writers, and storytellers now require collaborative tools that transcend traditional mediums. For example, remote or virtualized creators demand virtualized tools to collaboratively build immersive, interactive worlds where the tools are required to explore rich narratives, create their own stories, or participate in live theatrical performances. With current virtual reality based collaborative environments, it is difficult to log, control, and moderate collaborative actions from a plurality of users, where all users are utilizing the same collaborative environment. Additionally, current virtual collaboration techniques fail to ensure that collaborating users are not recorded within generating media content and during the media content recording process. Removing said users or unwanted objects in post-production is a computationally intensive and monetarily significant procedure.

Embodiments of the present invention provide an effective, virtual collaborative environment that ensures media content collaboration, generation, alteration, and recordation without recording extraneous users or objects. Embodiments of the present invention create and maintain one or more volumetric boundaries that allow users to collaborate and create media content. Embodiments of the present invention limit volumetric recording to media content comprised within maintained volumetric boundaries. Embodiments of the present invention recognize that computational requirements are reduced by eliminating a need for post-production removal of users and extraneous objects in collaborative media content creation. Embodiments of the present invention tag media content with permissions or rules that control which users are able to access, view, modify, delete, and/or record the media content. Implementation of embodiments of the invention may take a variety of forms, and exemplary implementation details are discussed subsequently with reference to the Figures.

The present invention will now be described in detail with reference to the Figures.

FIG. 1 depicts computing environment 100 illustrating components of computer 101 in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as selective volumetric boundary recorder 150, hereinafter referred to as program 150. In addition to program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip". In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Program 150 is a program, a subprogram of a larger program, an application, a plurality of applications, or mobile application software, which functions to record selective volumetric boundaries. In various embodiments, program 150 may implement the following steps: identify at least one collaborating user within a virtual collaborative environment; define at least one volumetric boundary within the virtual collaborative environment; generate media content initiated by the at least one identified collaborating user within the at least one defined volumetric boundary; and selectively record the generated media content within the at least one defined volumetric boundary. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over WAN 102. In various embodiments, client versions of program 150 resides on any other computing device (not depicted) within computing environment 100. Program 150 is depicted and described in further detail with respect to FIG. 2.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

FIG. 2 depicts flowchart 200 illustrating operational steps of program 150 for selective volumetric boundary recording, in accordance with an embodiment of the present invention.

Program 150 identifies one or more volumetric boundaries within a collaborative environment (step 202). In an embodiment, program 150 initiates responsive to a request for a recording of volumetric video in a virtual reality (VR) collaborative environment or virtual collaborative environment. In another embodiment, program 150 initiates responsive to a start of a collaborative session (e.g., one or more users enter the collaborative environment). In yet another embodiment, program 150 initiates responsive to a user interacting (e.g., playing; navigating; accessing; changing viewing direction, angle, perspective, or viewed object) within a collaborative environment (e.g., one or more users collaborating within one or more distinct volumetric boundaries). In another embodiment, the collaborative environment comprises one or more physical environments (e.g., conference room, maker workshop, warehouse) virtually mapped to the collaborative environment. In another embodiment, a collaborative environment contains a plurality of shared collaborative spaces where users collaborate in real-time on media projects, allowing multiple users to simultaneously work on media content.

In an embodiment, program 150 identifies one or more users within a collaborative environment. In this embodiment, program 150 utilizes user participation and authentication to identify each user. In another embodiment, program 150 utilizes computer vision techniques to identify each user. Responsively, program 150 categorizes each individual as a recording user (e.g., user that has permission to initiate recordings, adjust recordings, participate within recordings, generate and adjust volumetric boundaries) or as a non-recording user (e.g., support staff, camera crews, assistants) based on associated permissions. In an embodiment, each user in the collaborative environment is associated with a virtual reality (VR) headset that transmits respective user motion tracking information to program 150. In an embodiment, program 150 monitors a location of a user within the collaborative environment and a physical location utilizing the VR headset. In another embodiment, program 150 generates and projects a user interface to each user utilizing respective VR headsets. In another embodiment, program 150 provides eye tracking capabilities allowing users to submit selections or actions to program 150 through tracked user eye movements and directional eye focusing. For example, a user selects a volumetric boundary to adjust by visually focusing on the volumetric boundary for a specified period of time.

In an embodiment, program 150 identifies a context (e.g., educational content, governmental content) of media creation for each identified volumetric boundary within the collaborative environment. In another embodiment, the context of media creation includes, but is not limited to, media creation purpose (e.g., educational video on birds), intended audience (e.g., warehouse workers), and restricted users (e.g., employees without a specific job title or role). In an embodiment, program 150 identifies the context by prompting for user input, user profile, retrieving user historical contexts, or correlating the physical environment of the user with one or more contexts, each with a respective probability. For example, the identified context of media creation for a user is identified as a business context due to the user being presented in a virtual conference room or located in a physical conference room. In an embodiment, program 150 adjusts a virtualized subsection of the collaboration environment that is mapped to a physical environment within a proximity to the user (e.g., within a 10 foot radius of the user) based on the identified context. For example, if program 150 determines that the media content has a context of education, then program 150 adjusts a subsection of the collaborative environment based on the identified context. In this example, the adjustment includes, but is not limited to, adding or removing of features, user interface elements, permissions, and recording restrictions.

Responsive to program 150 identifying a user, program 150 prompts the identified user to define one or more volumetric boundaries within the collaborative environment. In an embodiment, a plurality of users simultaneously defines and/or adjusts volumetric boundaries within the collaborative environment. In an embodiment, program 150 provide tools (e.g., augmented reality overlays, voice recognition systems, gesture recognition systems) allowing users to create, modify, and define volumetric boundaries, such as tools to browse stored media content and respective volumetric boundaries (e.g., containers), facilitate gesture-based and voice-based alterations (e.g., specific gestures for actions such as drawing media content, moving volumetric boundaries, or interacting with the environment). For example, program 150 tracks an identified user creating a new volumetric boundary by interpreting user hand gestures to delineate the bounds of a rectangle (e.g., 1 foot by 2 feet by 1 foot) volumetric boundary. In an embodiment, media content presented or contained within a volumetric boundary will be recorded as detailed in step 208. In another embodiment, any physical object contained within a volumetric boundary mapped to a subsection of a physical location is virtualized and presented to other users with sufficient permissions. For example, a user creates a volumetric boundary around a physical table in proximity to the user and program 150 creates a virtual copy of the table. In various embodiments, recording outside a defined volumetric boundary is disabled or suspended. For example, any object inside (i.e., media content or physical object) the volumetric boundary is recorded and any object outside the volumetric boundary is not recorded. In an embodiment, program 150 allows a plurality of users to create and/or adjust one or more volumetric boundaries in the same collaborative environment, wherein the one or more volumetric boundaries may overlap. In another embodiment, program 150 tags a volumetric boundary with a permission, wherein the permission controls which users are able to view or adjust the volumetric boundary or media content within the volumetric boundary.

Program 150 determines one or more coordinates corresponding to the one or more identified volumetric boundaries (step 204). Responsive to program 150 identifying one or more volumetric boundaries, program 150 determines one or more three-dimensional (3D) coordinates of the volumetric boundary inside the collaborative environment. In this embodiment, program 150 utilizes spatial tracking to measure coordinates corresponding to a user defining at least one volumetric boundary, such as defining the volumetric boundary in the shape of a rectangle utilizing gestures. For example, program 150 utilizes a plurality of cameras within the collaborative environment or a physical location to spatially track a user definition of the volumetric boundary. In another embodiment, program 150 calculates or retrieves one or more specifications related to a physical object within a volumetric boundary. For example, program 150 utilizes computer vision to identify a physical object or an object comprised within media content and retrieve specifications (e.g., length, width, depth) associated with the identified media content. In this example, program 150 adjusts an existing volumetric boundary or creates a new volumetric boundary based on the retrieved specifications. In another embodiment, program 150 converts specifications into 3D coordinates mapped to the collaborative environment. In another embodiment, 3D coordinates are represented as a set of X, Y, and Z coordinates relative to a reference point within a physical environment in relation to the collaborative environment. In another embodiment, program 150 utilizes one or more VR headsets worn by one or more users to perform image analysis to track a position of the volumetric boundary and any adjustment to a position or an orientation of the volumetric boundary within the collaborative environment.

Program 150 generates media content for the one or more identified volumetric boundaries (step 206). Responsive to program 150 determining one or more coordinates of at least one volumetric boundary, program 150 generates media content within the volumetric boundary, ready for subsequent recording. In an embodiment, program 150 presents a user interface for the creation, alteration, or deletion of media content within one or more volumetric boundaries. For example, program 150 provides a user interface allowing a user to browse and select stored media content (e.g., images, videos, audio clips, 3D models). In another embodiment, program 150 provides voice recognition and synthesis techniques allowing communication with the user interface with user voice commands. For example, program 150 monitors user voice commands that include, but are not limited to, content creation, content modification (e.g., adding elements, removing elements, changing dimensions), navigation, and interactions with other virtual objects (i.e., media content). In another embodiment, program 150 provides content creation tools (e.g., 3D modeling, art brushes, and audio/video recording or editing tools) through associated VR headsets. In various embodiments, program 150 monitors and logs (e.g., blockchain) at least one user selecting media content, modifying the selected content, and completing the media content. For example, program 150 retrieves a musical composition (i.e., media content) and places a virtualized representation of the musical composition in one or more volumetric boundaries. In this example, a plurality of collaborating users continue to modify the musical composition and subsequently at least one user transmits a media content completion indication. In an embodiment, program 150 validates generated media content based on the determined context, as described in step 202. For example, program 150 determines that media content comprising comic book characters is unrelated to a previously determined educational context. In this example, program 150 removes the unrelated media content and notifies one or more users.

Program 150 selectively records the generated media content (step 208). In an embodiment, program 150 determines that media content is complete responsive to program 150 completing media content retrieval. In another embodiment, program 150 suspends any recording within a specific volumetric boundary until at least one user transmits or signals for media content completion (e.g., user is finished editing media content). For example, a signal for media content completion is transmitted responsive to a user clicking a presented "Finish" button on a provided user interface, utilizing a voice command or designated gesture. In an embodiment, program 150 determines that media content generation is complete by defining a time defined trigger based on user inactivity for a period of time. In this embodiment, program 150 determines that when user inactivity (e.g., user) meets or exceeds a time threshold, program 150 determines that the user finished with media content creation or editing, and the resulting media is ready for subsequent recording. For example, program 150 analyzes an editing log (e.g., blockchain comprising every addition, removal, and modification to media content within a volumetric boundary) associated with media content in a volumetric boundary and if program 150 determines that there have been no edits or changes to media content within a 30 minute period, then program 150 determines that media content is completed. In an embodiment, program 150 selectively records and, simultaneously, streams the media creation to one or more viewers. For example, program 150 selectively records a user generating media that is teaching a task and program 150 broadcasts or streams the recorded media immediately to one or more workers replicating the task.

In an embodiment, program 150 identifies every participating recording module or device in a collaboration environment and/or physical location associated with each respective identified user. In a further embodiment, program 150 identifies a respective position of each identified recording device in relation to each other recording device in the environment. In an embodiment, program 150 programmatically adjusts and controls each recording device to capture and identify each user, volumetric boundary, and object within the environment. In this embodiment, program 150 utilizes a video capture stream or feed from the identified recording device to construct a volumetric video in which each user and object in the environment (e.g., conference room) is visually represented in 3D. Responsively, program 150 identifies each volumetric boundary with at least one completed media content and retrieves associated coordinates, as described above. In an embodiment, program 150 initiates selective recording of each completed media content in a volumetric boundary responsive to a notification of media content completion. In this embodiment, program 150 only records completed media content in the volumetric boundary and program 150 does not record or dynamically removes any other media content or objects that are viewable to a recording device but outside the volumetric boundary. In an embodiment, program 150 selectively utilizes recording devices that do not have obstructing users or extraneous objects that are not to be recorded (e.g., not media content or outside a volumetric boundary).

In various embodiments, program 150 utilizes a generative adversarial network (GAN) to merge a plurality of media content recordings responsive to a plurality of overlapping volumetric boundaries. For example, media content (e.g., a virtual fish) in a first volumetric boundary is merged by the GAN with media content (e.g., an underwater environment) in a second volumetric boundary, responsive to the first volumetric boundary overlapping with the second volumetric boundary. In this example, program 150 determines overlap by comparing respective coordinates, as discussed in step 204. In another embodiment, program 150 splits merged media content responsive to at least one volumetric boundary removing an overlap with at least one other volumetric boundary. In an embodiment, program 150 utilizes the identified users, objects, and respective relative positioning, determined from respective coordinates, to create a closed loop contour of a virtual wall to remove extraneous users and objects.

Figure 3:
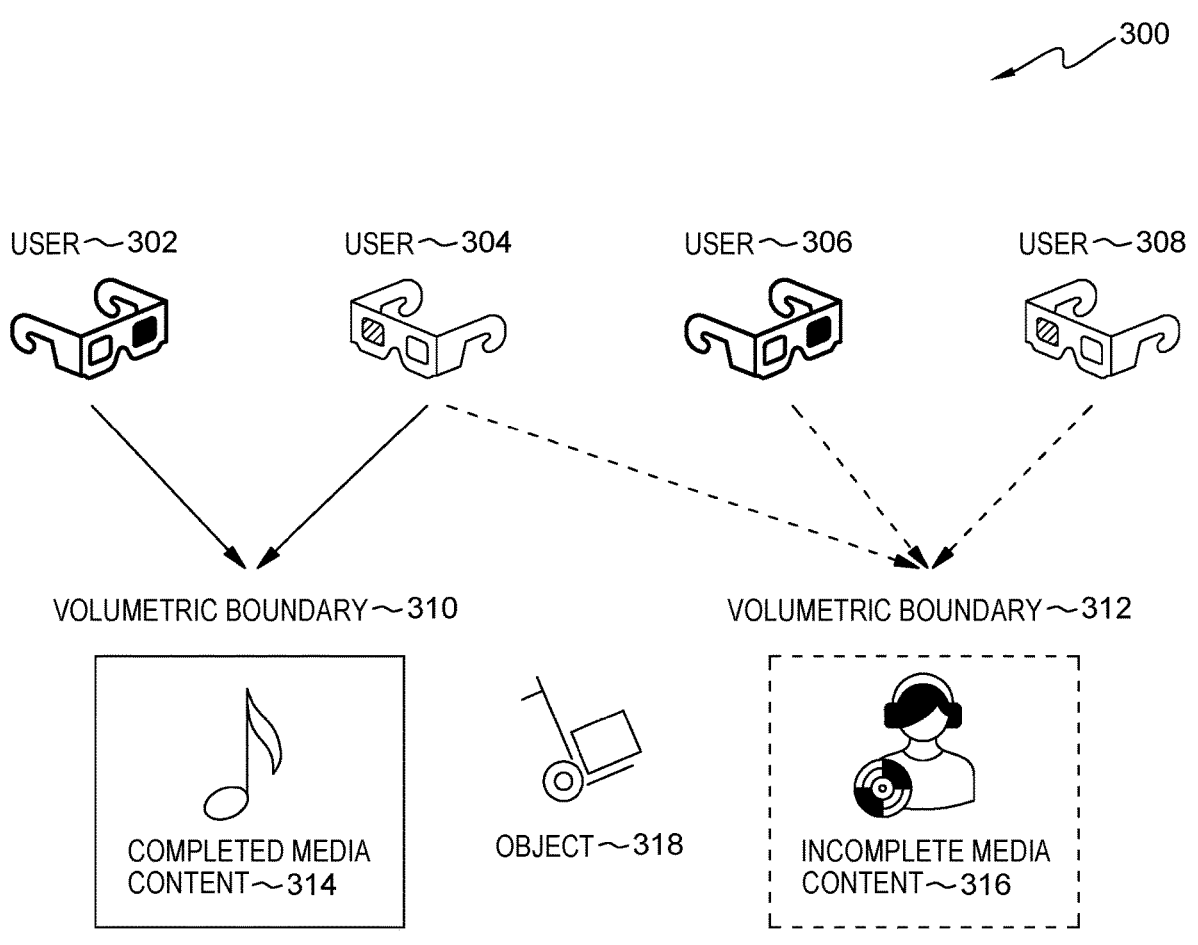
FIG. 3 is an exemplary illustration of the program within the computing environment of FIG. 1, in accordance with an embodiment of the present invention.

FIG. 3 depicts example 300, in accordance with an illustrative embodiment of the present invention. Example 300 contains user 302, user 304, user 306, and user 308 collaborating within volumetric boundary 310 and volumetric boundary 312. Example 300 also contains object 318 which is not contained within any volumetric boundary. Volumetric boundary 310 contains completed media content 314 and volumetric boundary 312 contains incomplete media content 316. User 302 and user 304 have permission to modify completed media content 314 while user 304, user 306, and user 308 have permission to modify incomplete media content 316. Program 150 prevents user 306 and user 308 from viewing or modifying completed media content 314. Additionally, program 150 prevents user 302 from viewing or modifying incomplete media content 316. Program 150 prevents any recording of incomplete media content 316 until program 150 determines that incomplete media content 316 is completed. Responsive to a completed indication, program 150 will record incomplete media content 316. User 302 and user 304 have finished collaborating on completed media content 314 and have sent an indication of completion to program 150, program 150 responsively initiates a recording of complete media content 314 and excludes recording of object 318 and any of the users.

What is claimed is:

1. A computer-implemented method comprising:
   identifying a plurality of users within a virtual collaborative environment;
   categorizing the plurality of users into at least one recording user and at least one non-recording user, wherein only the at least one recording user has permission to adjust recordings within the virtual collaborative environment;
   defining at least one volumetric boundary within the virtual collaborative environment;
   generating media content initiated by the at least one identified recording user within the at least one defined volumetric boundary; and
   selectively recording the generated media content within the at least one defined volumetric boundary.

2. The computer-implemented method of claim 1, wherein defining the at least one volumetric boundary within the virtual collaborative environment comprises:
   prompting the recording user to define at least one volumetric boundary within the virtual collaborative environment.

3. The computer-implemented method of claim 1, further comprising:
   identifying a context of media creation associated with the at least one defined volumetric boundary by correlating a physical environment of the user with the context of the media creation, wherein the context of the media creation comprises a selection from the group consisting of: a media creation purpose, an intended audience, and users restricted from accessing the generated media content within the at least one defined volumetric boundary.

4. The computer-implemented method of claim 3, further comprising:
   validating the generated media content based on the identified context.

5. The computer-implemented method of claim 1, further comprising:
   identifying one or more 3D coordinates of the at least one volumetric boundary within the virtual collaborative environment.

6. The computer-implemented method of claim 1, further comprising:

suspending a recording of the media content within the at least one volumetric boundary until the recording user transmits a media content completion.

7. The computer-implemented method of claim 1, further comprising:

streaming the selectively recorded media content to one or more viewers.

8. The computer-implemented method of claim 1, wherein generating the media content comprises generating audio media content.

9. A computer program product comprising:

one or more computer readable storage media; and program instructions stored on the one or more computer readable storage media to perform operations comprising:

identifying a plurality of users within a virtual collaborative environment;

categorizing the plurality of users into at least one recording user and at least one non-recording user, wherein only the at least one recording user has permission to adjust recordings within the virtual collaborative environment;

defining at least one volumetric boundary within the virtual collaborative environment;

generating media content initiated by the at least one identified recording user within the at least one defined volumetric boundary; and selectively recording the generated media content within the at least one defined volumetric boundary.

10. The computer program product of claim 9, wherein the defining the one or more volumetric boundaries within the virtual collaborative environment comprises:

prompting the recording user to define at least one volumetric boundary within the virtual collaborative environment.

11. The computer program product of claim 9, wherein the operations further comprise:

identifying a context of media creation associated with the at least one defined volumetric boundary by correlating a physical environment of the user with the context of the media creation, wherein the context of the media creation comprises a selection from the group consisting of: a media creation purpose, an intended audience, and users restricted from accessing the generated media content within the at least one defined volumetric boundary.

12. The computer program product of claim 11, wherein the operations further comprise:

validating the generated media content based on the identified context.

13. The computer program product of claim 9, wherein the operations further comprise:

identifying one or more 3D coordinates of the at least one volumetric boundary within the virtual collaborative environment.

14. The computer program product of claim 9, wherein the operations further comprise the steps of:

suspending a recording of the media content within the at least one volumetric boundary until the recording user transmits a media content completion.

15. A computer system comprising:

a processor set;

one or more computer readable storage media; and program instructions stored on the one or more computer readable storage media processor set to perform operations comprising:

identifying a plurality of users within a virtual collaborative environment;

categorizing the plurality of users into at least one recording user and at least one non-recording user, wherein only the at least one recording user has permission to adjust recordings within the virtual collaborative environment;

defining at least one volumetric boundary within the virtual collaborative environment;

generating media content initiated by the at least one identified recording user within the at least one defined volumetric boundary; and selectively recording the generated media content within the at least one defined volumetric boundary.

16. The computer system of claim 15, wherein the defining the one or more volumetric boundaries within the virtual collaborative environment comprises:

prompting the recording user to define at least one volumetric boundary within the virtual collaborative environment.

17. The computer system of claim 15, wherein the operations further comprise:

identifying a context of media creation associated with the at least one defined volumetric boundary by correlating a physical environment of the user with the context of the media creation, wherein the context of the media creation comprises a selection from the group consisting of: a media creation purpose, an intended audience, and users restricted from accessing the generated media content within the at least one defined volumetric boundary.

18. The computer system of claim 17, wherein the operations further comprise:

validating the generated media content based on the identified context.

19. The computer system of claim 15, wherein the operations further comprise:

identifying one or more 3D coordinates of the at least one volumetric boundary within the virtual collaborative environment.

20. The computer system of claim 15, wherein the operations further comprise:

suspending a recording of the media content within the at least one volumetric boundary until the recording user transmits a media content completion.

* * * * *